A. W. LEWIS.
WATER PIPE SYSTEM.
APPLICATION FILED MAR. 23, 1912.
1,056,698.
Patented Mar. 18, 1913.
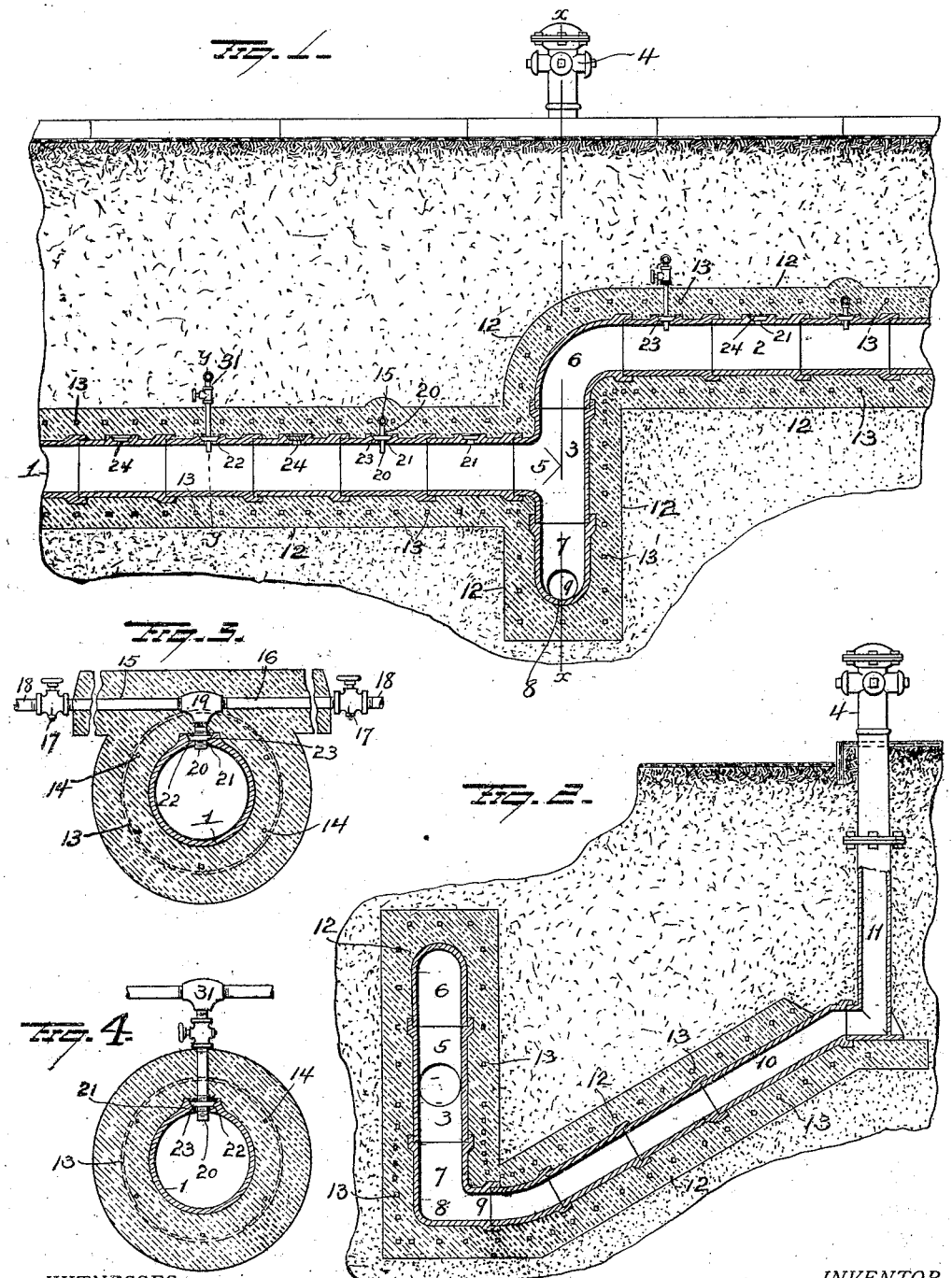

UNITED STATES PATENT OFFICE.

ABRAHAM W. LEWIS, OF TRENTON, NEW JERSEY.

WATER-PIPE SYSTEM.

1,056,698. Specification of Letters Patent. Patented Mar. 18, 1913.

Application filed March 23, 1912. Serial No. 685,875.

*To all whom it may concern:*

Be it known that I, ABRAHAM W. LEWIS, a citizen of the United States, residing at Trenton, in the county of Mercer and State of New Jersey, have invented certain new and useful Improvements in Water-Pipe Systems; and I do hereby declare the following to be a full, clear, and exact description of the invention, such as will enable others skilled in the art to which it appertains to make and use the same.

This invention relates to improvements in water-pipe systems,—one object of the invention being to provide in such a system, means which effectually protect the pipe from damage due to the pressure of the water and to prevent deterioration of the pipe by electrolysis when the pipe comprises metallic sections.

A further object is to provide a water pipe system with trap devices, which shall be so constructed and arranged that they will effectually arrest solid foreign matter, and from which such foreign matter can be withdrawn, with the use of fire-plugs.

A further object is to provide simple and efficient means for effecting the connections between the house pipes or laterals and the water main.

With these and other objects in view, the invention consists in certain novel features of construction and combinations of parts as hereinafter set forth and pointed out in the claim.

In the accompanying drawings; Figure 1 is a longitudinal sectional view showing a portion of a water pipe system embodying my improvements; Fig. 2 is a sectional view on the line $x$—$x$ of Fig. 1; Fig. 3 is an enlarged transverse sectional view showing the manner of connecting house pipes with the main and reinforcing both the main and house pipe connections, and Fig. 4 is an enlarged sectional view on the line $y$—$y$ of Fig. 1.

1, 2, represent two portions of a water main, connected by a trap-device 3, and each portion of the main will be so laid that it will have a gradual drop from one trap to the next, approximately equal to the extent of rise between two adjacent portions of the main which communicate with the same trap; and each trap will be located in proximity to a fire plug 4, with which it communicates as hereinafter explained.

The water main comprises a plurality of pipe sections, which may be made of suitable material, but which I prefer to construct of earthenware, which will not be affected by electrolysis caused by leakage of electric current from electric railways or other electric systems. Each trap 3 may also be made of earthenware members and includes a T-section 5, the intermediate arm of which communicates with the portion 1 of the main; a curved elbow 6 connecting the upper end of the T-coupling with one end of the next portion 2 of the main, and an L-coupling 7 communicating with the lower end of the T-coupling and constituting a sediment chamber 8. The lateral arm 9 of the L-coupling is reduced in size and communicates with one end of an inclined pipe 10 which coöperates with the part 9 in forming one arm of the trap. The pipe 10 may be made in sections of tiling and is connected with the stand pipe 11 of the fire plug 4.

It is evident that sediment in the water will become deposited in the sediment chamber 8 of the trap as the water flows through the latter, from the depressed end of one portion of the main to the next higher portion, and that the sediment can be readily removed from the trap periodically, by simply opening the fire-plug,—thus causing a flow of water through the sediment chamber, (flushing the latter) and finding an exit through the fire plug. In this way, the system can be kept clean by avoiding a collection of sediment in the main.

The water main, as well as the traps 3 and the house-pipe connections are embedded in concrete or cement (as indicated at 12), which is preferably reinforced by means of embedded metallic rings 13 and also by means of embedded metal rods 14 if desired.

By embedding the water mains and their connections in concrete or cement, the same will be reinforced to withstand the water pressure, especially when earthenware is employed in the construction of the system. When metallic pipe sections are employed, the inclosing concrete or cement will serve effectually to prevent deterioration of the pipes by electrolytic action, when the pipes are in the zone of stray currents from electric railway or other electric street systems. Should deterioration of the pipes occur from any cause, after lengthy usage, the concrete or cement (having become firmly set and very hard and rigid) will form ducts which will serve the functions of the mains, traps and connections.

In Fig. 3 of the drawing, I have illustrated the manner in which the connection of the house pipes with the main can be conveniently effected. In this construction, the lateral pipes 15—16 are incased in cement where they extend through that portion of the road bed of the street in which the pipes are liable to be subject to electrolytic action. Beyond the concrete or cement, the lateral pipes are provided with suitable valves 17, and uncovered pipes 18 extend from these valves to the houses. The pipes 15—16 are connected by a coupling 19 embedded in the concrete or cement over the water main, and from this coupling, a short, threaded pipe section 20 depends for connection with the water main. The pipe sections composing the water main are provided with openings 21, each surrounded by a seat 22. The short pipe section 20 of a house connection, passes through an opening 21 of one of the pipe sections of the main, and also through a disk 23 having a threaded hole for its accommodation, said disk being adapted to rest on the seat 22 surrounding said opening, and to be held firmly in place by the concrete or cement. The openings 21 in the sections of the main where it is not desired to make pipe connections, will be closed by disks 24, held on the seats 22 by the concrete or cement.

When the house pipes are not to be subjected to electrolytic action, the lateral concrete portions shown in Fig. 3 may be omitted, and the house connections arranged as shown at 31 Figs. 1 and 4.

Various slight changes might be made in the details of construction of my invention without departing from the spirit thereof or limiting its scope, and hence I do not wish to restrict myself to the exact details herein set forth.

Having fully described my invention what I claim as new and desire to secure by Letters-Patent, is—.

A water pipe system comprising a plurality of water-main sections and a trap interposed between each two water sections, one of said water-main sections communicating with the upper end of the trap and the other water-main section communicating with the trap between the ends of the latter, the lower arm of said trap extending laterally and upwardly for connection with a water plug, said main sections having holes surrounded by seats, lateral pipe connections to enter said holes, disks secured to said lateral pipe connections and disposed on said seats, cement embedding said main sections and holding said disks in place, and cement embedding the trap.

In testimony whereof, I have signed this specification in the presence of two subscribing witnesses.

ABRAHAM W. LEWIS.

Witnesses:
GARDNER H. CAIN,
J. CONNER FRENCH.

---

Copies of this patent may be obtained for five cents each, by addressing the "Commissioner of Patents, Washington, D. C."